(12) United States Patent
Moreau et al.

(10) Patent No.: US 12,188,689 B2
(45) Date of Patent: Jan. 7, 2025

(54) CONTROL OF AN ELECTRIC WATER HEATER AS PER A LOAD SHEDDING REQUEST SIGNAL AND A SALUBRITY INDEX

(71) Applicant: HYDRO-QUÉBEC, Quebec (CA)

(72) Inventors: Alain Moreau, Quebec (CA); André Laperrière, Quebec (CA); François Laurencelle, Quebec (CA)

(73) Assignee: HYDRO-QUÉBEC, Quebec (CA)

( * ) Notice: Subject to any disclaimer, the term of this patent is extended or adjusted under 35 U.S.C. 154(b) by 835 days.

(21) Appl. No.: 17/269,293

(22) PCT Filed: Aug. 30, 2019

(86) PCT No.: PCT/CA2019/051211
§ 371 (c)(1),
(2) Date: Feb. 18, 2021

(87) PCT Pub. No.: WO2020/047652
PCT Pub. Date: Mar. 12, 2020

(65) Prior Publication Data
US 2021/0180829 A1 Jun. 17, 2021

(30) Foreign Application Priority Data
Sep. 7, 2018 (CA) ..................... 3016933

(51) Int. Cl.
*F24H 15/14* (2022.01)
*F24D 13/00* (2006.01)
(Continued)

(52) U.S. Cl.
CPC ........... *F24H 9/2021* (2013.01); *F24D 13/00* (2013.01); *F24H 1/0018* (2013.01); *F24H 1/185* (2013.01);
(Continued)

(58) Field of Classification Search
CPC ...... F24H 9/2021; F24H 9/205; F24H 15/108; F24H 15/14; F24H 15/174; F24H 15/104;
(Continued)

(56) References Cited

U.S. PATENT DOCUMENTS 2,238,600 A * 4/1941 Reifenberg ........... F24H 9/2021
392/464
5,168,546 A * 12/1992 Laperriere .............. F24H 1/185
219/535
(Continued)

FOREIGN PATENT DOCUMENTS

CN 108411986 A * 8/2018 ............. E03B 1/048
CN 113494734 A * 10/2021 ......... F24D 19/1096
(Continued)

*Primary Examiner* — Gregory A Wilson
(74) *Attorney, Agent, or Firm* — Muirhead and Saturnelli, LLC

(57) ABSTRACT

An electrical water heater that receives a load shedding request signal uses a temperature sensor that is positioned so as to measure a water temperature in a lower area of a tank of the water heater. A controller continuously determines a salubrity index of the water heater as a function of the temperature measured by the sensor and a time measurement. The controller decides to interrupt an electrical power supply of the water heater through a switch so as to interrupt or not interrupt an operation of the water heater upon receipt of the load shedding request signal and only if the salubrity index meets a preestablished criterion.

19 Claims, 5 Drawing Sheets

(51) Int. Cl.
*F24H 1/00* (2022.01)
*F24H 1/18* (2022.01)
*F24H 1/20* (2022.01)
*F24H 9/20* (2022.01)
*F24H 15/104* (2022.01)
*F24H 15/108* (2022.01)
*F24H 15/168* (2022.01)
*F24H 15/174* (2022.01)
*F24H 15/225* (2022.01)
*F24H 15/269* (2022.01)
*F24H 15/37* (2022.01)
*F24H 15/421* (2022.01)
*F24H 15/45* (2022.01)
*F24H 15/486* (2022.01)
*H05B 1/02* (2006.01)
*F24H 15/184* (2022.01)

(52) U.S. Cl.
CPC ........... *F24H 1/201* (2013.01); *F24H 15/104* (2022.01); *F24H 15/108* (2022.01); *F24H 15/14* (2022.01); *F24H 15/168* (2022.01); *F24H 15/174* (2022.01); *F24H 15/225* (2022.01); *F24H 15/269* (2022.01); *F24H 15/37* (2022.01); *F24H 15/421* (2022.01); *F24H 15/45* (2022.01); *F24H 15/486* (2022.01); *H05B 1/0297* (2013.01); *F24D 2200/08* (2013.01); *F24H 15/184* (2022.01)

(58) Field of Classification Search
CPC ........ F24H 15/45; F24H 15/269; F24H 15/37; F24H 15/486; F24H 15/421; F24H 15/168; F24H 15/225; F24H 15/219; F24H 1/0018; F24H 1/185; F24H 1/201; F24D 13/00; F24D 2200/08; F24D 17/0026; F24D 17/0031; F24D 19/1051; F24D 19/1096; H05B 1/0297

USPC ....................................................... 237/8 A
See application file for complete search history.

(56) References Cited

U.S. PATENT DOCUMENTS

| | | | | |
|---|---|---|---|---|
| 5,808,277 | A | * | 9/1998 | Dosani ............... F24D 17/0073 219/486 |
| 8,204,633 | B2 | | 6/2012 | Harbin, et al. |
| 8,588,991 | B1 | | 11/2013 | Forbes |
| 9,927,131 | B2 | | 3/2018 | Rognli et al. |
| 10,139,135 | B1 | * | 11/2018 | Lesage ............... F24D 19/1051 |
| 10,837,674 | B2 | * | 11/2020 | Lesage ............... H05B 1/0283 |
| 2003/0168441 | A1 | * | 9/2003 | Liu ..................... H05B 1/0283 219/505 |
| 2005/0235306 | A1 | * | 10/2005 | Fima ................... F24D 19/1051 141/192 |
| 2007/0245980 | A1 | * | 10/2007 | Phillips ............... F24H 9/2021 236/20 R |
| 2007/0246551 | A1 | * | 10/2007 | Phillips ............... F24H 15/464 236/20 R |
| 2012/0118989 | A1 | | 5/2012 | Buescher et al. |
| 2013/0200168 | A1 | * | 8/2013 | Buescher ............. F24H 15/238 29/428 |
| 2015/0245425 | A1 | * | 8/2015 | Correa Hidalgo ....... H05B 6/70 219/688 |
| 2018/0080684 | A1 | | 3/2018 | Lesage |
| 2020/0200402 | A1 | * | 6/2020 | Rouleau .............. F24H 9/1818 |
| 2022/0412606 | A1 | * | 12/2022 | Rempe ................ F24H 15/14 |

FOREIGN PATENT DOCUMENTS

| | | | | |
|---|---|---|---|---|
| DE | 195 24 079 B4 | | 8/2006 | |
| GB | 2456881 A | * | 8/2009 | ........... F24H 9/2021 |
| JP | 58104452 A | * | 12/1981 | ........... F24H 15/395 |

* cited by examiner

CONTROL OF AN ELECTRIC WATER HEATER AS PER A LOAD SHEDDING REQUEST SIGNAL AND A SALUBRITY INDEX

FIELD OF THE INVENTION

The invention generally relates to the power demand management of apparatuses on an electrical network, and more particularly to a system and a method for controlling an electric water heater as per a load shedding request signal and a salubrity index of the water heater measured in a continuous mode.

CONTEXT

Some management systems of water heaters in peak period of an electrical network are already known. U.S. Pat. No. 8,204,633 (Harbin, III et al.), U.S. Pat. No. 8,588,991 (Forbes, Jr.), U.S. Pat. No. 9,927,131 (Rognli et al.), and US patent application 2012/0118989 (Buescher et al.) provide examples of management systems that allows in particular to remotely interrupt the operation of water heaters and to turn them on again according to the needs of the network. However, bacteria such as Legionella may proliferate in the water heaters when their operation is interrupted, posing a risk for human health. It would thus be desirable that the management systems of water heaters have functionalities allowing taking into account the innocuousness of the water heater in particular to Legionella and managing the water heaters accordingly.

SUMMARY

An object of the present invention is to provide a system for continuously evaluating an innocuousness level to bacteria, e.g. Legionella, of an electric water heater, e.g. domestic, and for controlling the water heater in a context of power demand management in a safe way for human health.

According to an embodiment of the invention, there is provided a system for controlling an electric water heater as per a load shedding request signal, the system comprising:
a temperature sensor positioned in order to measure a temperature of water in a lower area of a tank of the water heater;
a switch coupled to an electrical power supply circuit of the water heater, an opening and a closing of the switch being controllable by a control signal in order to interrupt or not interrupt an operation of the water heater; and
a controller connected to the temperature sensor and to the switch, the controller being configured to:
continuously determine a salubrity index of the water heater as a function of the temperature measured by the temperature sensor and a time measurement; and
producing the control signal of the switch so that the switch causes an interruption of the operation of the water heater upon the load shedding request signal only if the salubrity index meets a preestablished criterion.

According to another embodiment of the invention, there is provided a method for controlling an electric water heater as per a load shedding request signal, the method comprising the steps of:
positioning a temperature sensor in order to measure a temperature of water in a lower area of a tank of the water heater;
coupling a switch to an electrical power supply of the water heater, an opening and a closing of the switch being controllable by a control signal in order to interrupt or not interrupt an operation of the water heater; and
connecting a controller to the temperature sensor and to the switch, the controller being configured to:
continuously determine a salubrity index of the water heater as a function of the temperature measured by the temperature sensor and a time measurement; and
producing the control signal of the switch so that the switch causes an interruption of the operation of the water heater upon the load shedding request signal only if the salubrity index meets a preestablished criterion.

The controller can thus compute an innocuousness index to Legionella of the water heater and may decide to cut or to not cut its electrical power supply by means of the switch in order to interrupt the operation of the water heater depending on the computed index, when a load shedding request signal is received by the controller. In this way, the water heater may be authorized to participate or be excluded from participating to a power demand management event as a function of the value of the index. The system may be local, that is to say that the components performing computations and load shedding actions are near the water heater to be controlled. The system may also be decentralized, then involving a remote load manager, e.g. in a cloud network, that interacts with one or several water heaters. The system may in particular quantitatively provide a state of innocuousness or of salubrity of a water heater in real time on a time basis, e.g. daily or other.

BRIEF DESCRIPTION OF THE DRAWINGS

A detailed description of preferred embodiments of the invention will be given herein below with reference to the following drawings.

DETAILED DESCRIPTION OF THE PREFERRED EMBODIMENTS

As used in the context of the present disclosure, the term block represents a set of circuits of a device such as a controller or the like, contributing to one or several functions, unless the context involves a different meaning.

As an example, in the context of the present invention, the survival of 2 strains of Legionella pneumophilia (hereinafter also called "Legionella") have been measured, including one from a hot water heater, after incubation at 42° C. indicating a potential of heat resistance (Sanden 1989). The first strain (R1243) has been studied at 45, 50, 55, 60 and 66° C. and the second strain (426A) at 53° C. The value D, or the time required for a 90% decrease of the *Legionella* population, is indicated in table 1 that follows.

TABLE 1

Survival of legionella pneumophila serogroup 1

| Legionella pneumophila | Temperature (° C.) | Value D (time required for a 90% decrease) (minutes) |
|---|---|---|
| R1243 | 45 | 2500 |
| R1243 | 50 | 380 |
| R1243 | 55 | 13.9 |
| R1243 | 60 | 0.74 |
| R1243 | 66 | 0.45 |
| 426A | 53 | 100 |

Table 2 that follows provides the values of D that allows eradicating 90% of the bacterial population for temperatures comprised between 52 and 60° C.

TABLE 2

Value D as a function of the temperature

| Temperature (° C.) | Value D (minutes) |
|---|---|
| 52 | 200 |
| 53 | 100 |
| 54 | 60 |
| 55 | 14 |
| 56 | 10 |
| 57 | 5 |
| 58 | 4 |
| 59 | 2 |
| 60 | 1 |

On the basis of the results obtained according to the above tables, an index called Composite (or Contamination) Index of *Legionella* (CIL) may be developed. The CIL may be the sum of the ratios between an actual time spent at a specific degree and a value D corresponding to this degree, for each degree between minimum and maximum temperatures Tmin and Tmax, for example 52 and 60° C. respectively for the case of Table 2:

$$CIL = \sum_{Tmin}^{Tmax} \frac{t}{D}$$

where:
t represents a time in minutes observed at a specific temperature T comprised between (T−0.5) to (T+0.4) in ° C.; and
D represents a value corresponding to the specific temperature, in minutes.

For example, for two hours at 53° C. and one hour at 54° C., a CIL of 2.2 is obtained (120/100+60/60). A CIL of one (1) means a decontamination capacity close to 90% and a 100% capacity to prevent the proliferation. A CIL of 2.2 means a capacity 2.2 times greater than a CIL of 1.

Figure 1:
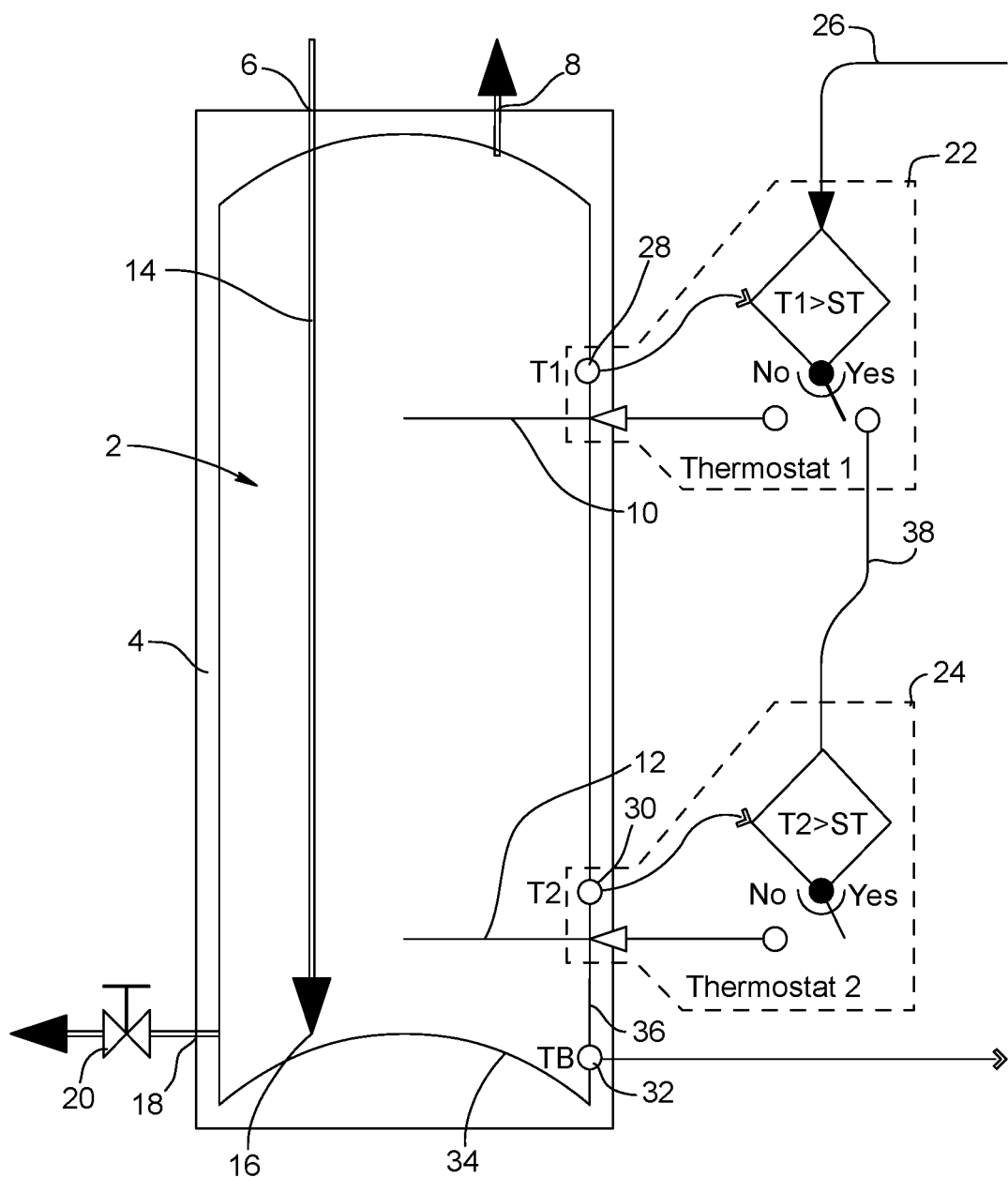
FIG. 1 is a schematic diagram of an electric water heater adapted to an embodiment of the invention.

Referring to FIG. 1, a water heater adapted to an embodiment of the system according to the invention is illustrated. This configuration of water heater is for explanation purposes and is not limiting because the system according to the invention is applicable to other configurations of water heaters. The water heater comprises a tank 2 surrounded by insulating foam 4. The tank 2 has a water inlet 6 (normally cold), a water outlet 8 (normally hot), and heating elements 10, 12 positioned respectively in upper and lower areas of the tank 2. The water inlet 6 is provided with a pipe (represented by arrow 14) leading the water to the bottom 16 of the tank 2, in the lower area where the heating element 12 is located. The water inlet 6 has a mouth external to the tank connectable to a source of water such as a municipal water supply or a well (not shown). Preferably, the tank 2 also comprises a lower outlet 18 provided with a valve 20 for allowing the tank 2 to be purged during maintenance operations on the water heater. Thermostats 22, 24 are used to control an electrical power supply 26 applied to the heating elements 10, 12, at setpoint temperatures ST generally preset according to standards of risks of skin burns and of bacterial contamination, with respect to the temperatures measured by the thermostats 22, 24 at the points 28, 30 of the tank 2.

The tank 2 is also provided with a temperature sensor 32 for measuring a temperature TB of water in the lower area of the tank 2. Preferably, the temperature sensor 32 is located at a height corresponding to a low point of the tank 2, where the coldest section of the water volume is located, under the lower heating element 12, for example in the first centimeters of the bottom of the tank 2 of the water heater, such as at a junction of the bottom 34 and a peripheral wall 36 of the tank 2, because it is a location in the water heater which is more prone to a bacterial proliferation. The temperature sensor 32 may be submerged inside the tank 2 or it may be affixed on an outer face of the tank 2. The sensor 32 may also be positioned under the tank 2, at the lowest point.

As the lowermost heating element 12 is generally located above the lowermost point of the tank 2, it cannot be presumed that a thermal conduction and a movement of the water induced by convection are sufficient to heat and maintain the water at the bottom of the tank 2 in thermal conditions favorable to the destruction of *Legionella*, in a conventional operation mode of the water heater.

The operation of the water heater may run as follows. The water heater has an electrical power supply 26, typically of 3 or 4.5 kilowatts (kW), adapted to the volume of the tank 2, typically of 180 or 270 liters (40 or 60 gallons). The electrical power supply 26 is connected to the thermostat 22 of the heating element 10. The thermostats 22, 24 may be mechanical (bimetallic thermostats) and may comprise a deadband, that is to say that the triggering and stopping temperatures of the power supply of the heating elements 10, 12 are different by a few Celsius degrees (° C.). This temperature distance is referred to as the deadband of a thermostat. The thermostats 22, 24 are connected in cascade, that is to say that the upper heating element 10 has priority over the lower heating element 12. When the temperature T1 at a height of the upper thermostat 10 having priority (thermostat 1) falls below the setpoint temperature ST minus a fraction of the deadband, the heating element 10 is then connected to the electrical power supply 26 of the water heater while the circuit 38 supplying the lower thermostat 24 (thermostat 2) is opened (disconnected). The heating of the water by the upper heating element 10 is necessary because a condition T1>ST (temperature measured by the thermostat 22) is not met (no). After heating the water for a while, the temperature T1 in relation to the upper thermostat 22 becomes greater than ST plus a fraction of the deadband. In this condition, the upper thermostat 22 (thermostat 1), seeing its setpoint satisfied (yes), interrupts the power supply of the upper heating element 10 and diverts the electrical power supply towards the circuit 38 of the lower thermostat 24 (thermostat 2). In a condition where the lower thermostat 24 receives the electrical power supply, if the temperature T2 measured at the height of the lower thermostat 24 drops below the setpoint temperature ST minus a fraction of the deadband, the heating element 12 is then powered. The heating of the water by the lower heating element 12 is then necessary because a condition T2>ST is not met (no). After heating the water for a while, the temperature T2 in relation to the lower thermostat 12 becomes greater than ST plus a fraction of the deadband. In this condition, the lower thermostat 24 (thermostat 2), seeing its setpoint satisfied (yes), interrupts the power supply of the lower heating element 12.

Figure 2:
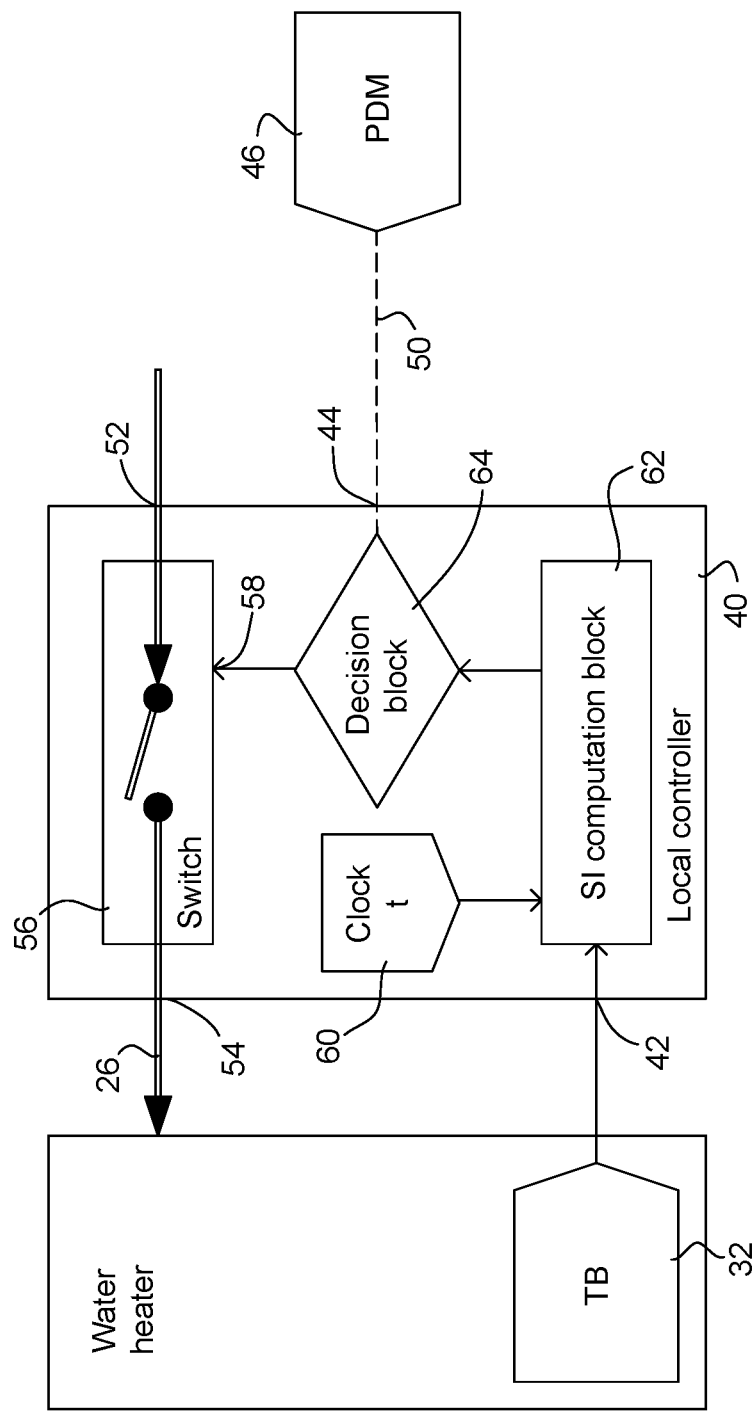
FIG. 2 is a schematic diagram illustrating a local direct control of a water heater according to an embodiment of the invention.

Referring to FIG. 2, an implementation of the system according to the invention comprises a local controller 40 that allows diagnosing a salubrity of the water heater and taking a final decision, that is if its safe from a public health point of view to interrupt or not interrupt the electrical power supply 26 of the water heater in a demand management context. The local controller 40 has an input 42 for receiving the measurement TB of the temperature sensor 32 located at the bottom of the water heater. The controller 40 has another input 44 for receiving a load shedding request signal indicative of a power demand management event PDM 46 produced by a utility company or a system aggregator. The local controller 40 has an input 52 for receiving the main electrical power supply from the electrical network and intended for the water heater, an output 54 for providing the electrical power supply 26 to the water heater, and a switch 56 coupled between the electrical power supply input 52 and output 54 of the local controller 40. The switch 56 has a control input 58 for receiving a control signal determining open and closed states of the switch 56. The switch 56 may also be a separate element of the local controller 40 if desired, as long as its opening and closing are controllable by the control signal so as to interrupt or not interrupt an operation of the water heater. The local controller 40 comprises an arrangement of electronic components that may be powered by the main electrical power supply. The electronic components of the local controller 40 comprise a clock 60 that provides a time measurement t. The local controller 40 executes a continuous process that processes the time measurement t and the measurement TB provided by the temperature sensor 32 and performs and update of a salubrity index SI based for example on the CIL equation (or equivalent) defined hereinabove, as represented by block 62. The salubrity index SI and the load shedding request signal are then processed by a decision block 64 that may have conditional logic functions to execute a decision algorithm with respect to a preestablished salubrity criterion to determine if the electrical power supply 26 of the water heater may be interrupted without risk regarding *Legionella* or a bacterial proliferation possibly harmful to health. Thus, in response to a load shedding request signal, the switch 56 may be opened to cut the electrical power supply 26 of the water heater only if the salubrity index SI meets the salubrity criterion. For this purpose, a control signal intended for the switch 56 may be generated by the decision block 64 and transmitted to the control input 58 of the switch 56 that responds by adapting its conduction state by connecting or disconnecting the electrical power supply 26 of the water heater to or from the main electrical power supply. The clock 60, the block 62 and the decision algorithm 64 may be implemented by a circuit with programmable processor and memory (not shown), or by discrete electronic components providing the above described functions of the elements 60, 62 and 64. The salubrity index SI may be determined in a different way than by the CIL and another salubrity criterion may be defined accordingly if desired. For example, a possible criterion is to measure a temperature of 55° C. or more at the bottom of the tank during a minimum of 4 hours per day. The controller 40 connected to the temperature sensor 32 and to the switch 56 is thus configured to continuously determine a salubrity index of the water heater as a function of the temperature measured by the temperature sensor 32 and the time measurement that may be provided by the clock 60, and to produce the control signal of the switch 56 so that the switch 56 causes an interruption of the operation of the water heater when the load shedding request signal is activated and the salubrity index satisfies the preestablished criterion. The load shedding request signal intended for the water heater may be generated, if desired, depending on whether a client of the water heater accepts or not that his/her water heater be put to contribution during a PDM event, the acceptation being possibly modifiable through time by the client or upon his/her request.

The system according to the invention may be applied to different models of electric water heaters, e.g. an ordinary electric water heater similar to that shown in FIG. 1 before the addition of the temperature sensor 32, a high temperature water heater, a water heater with a recirculation pump, a water heater with an electric element coming from below. In the case of an ordinary electric water heater, the system according to the invention may be used to prevent it from participating to a PDM (power demand management) request if desired, since this type of water heater is at greater risk of not meting the salubrity criterion SI. The system according to the invention then provides a protection measure for the user with respect to the salubrity of the type of water heater that he or she uses.

Figure 3:
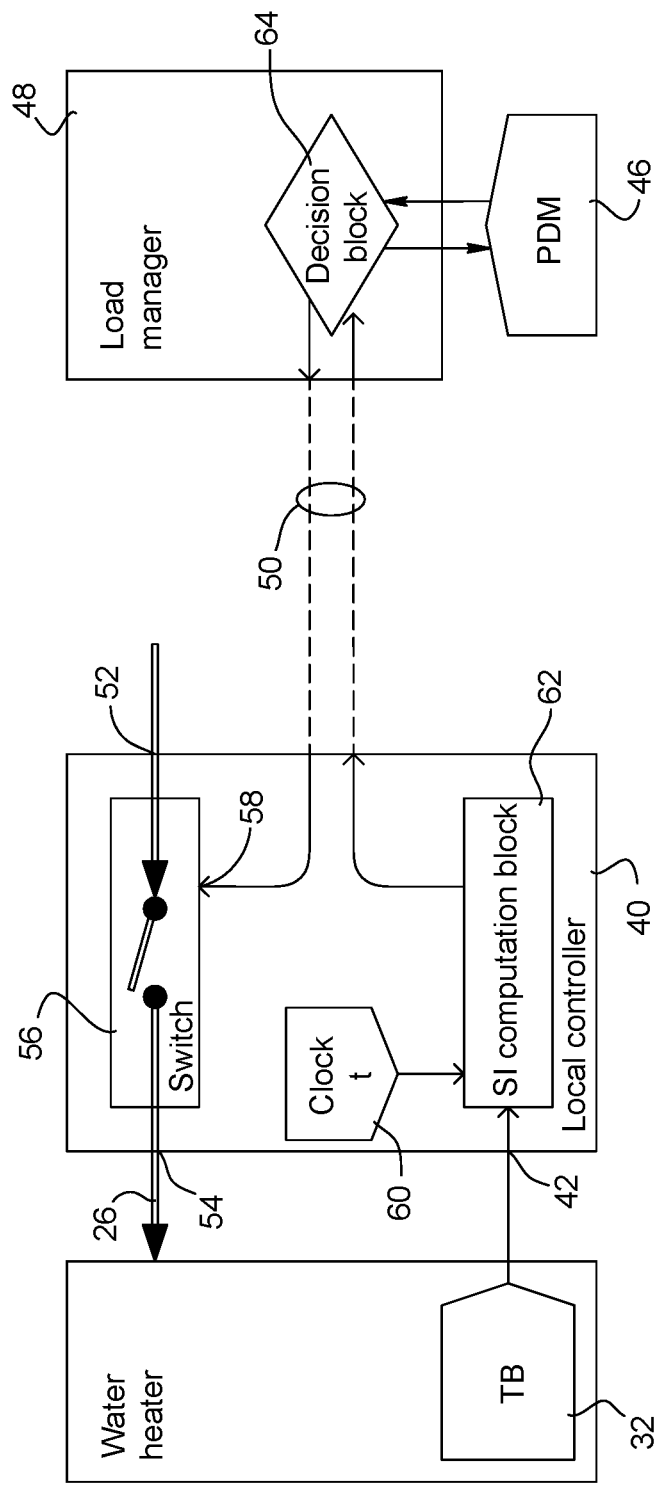
FIG. 3 is a schematic diagram illustrating an indirect control of a water heater by a load manager according to an embodiment of the invention.

Referring to FIG. 3, an implementation of the system according to the invention may be also achieved so that the final decision of interrupting or not interrupting the electrical power supply of the water heater is taken by a load manager 48 or, more generally, by a process physically separated from the local controller 40. The decision algorithm of the decision block 64 is then implemented in a load manager 48 acting as a remote controller. A bidirectional communication network or link 50 between the local controller 40 and the load manager 48 allows them to communicate together. The local controller 40 may be configured to transmit the updated value of the salubrity index SI to the load manager 48. The local controller 40 may also transmit the TB measurement of the temperature sensor 32 to the load manager 48 and the index SI may be computed by the load manager 48 to decide if it may interrupt or not the water heater during a power demand management request. The load manager 48 may have functions that are not limited to the control of a water heater. The load manager 48 may for example receive and share information with other systems such as electric or electronic apparatuses, thermostats or interfaces (not shown) allowing an interaction with the users or clients. A decision of the load manager 48 may consist in managing an operation of several water heaters and other apparatuses as a function of a goal as that of reacting to a PDM event issued by the utility company or the system aggregator. The load manager 48 transmits the decision to the local controller 40 that operates the switch 56 by connecting or disconnecting the electrical power supply 26 of the water heater. The interaction with a client may allow him/her for example to control the operation of his/her water heater as a function of time of use rates, when the computed CIL is indicative of an innocuousness to *Legionella* for a time period of interest where the operation of the water heater is interrupted. The interaction with a client may also allow him or her to remotely control the operation of his/her water heater, for example when the client goes on a trip or is absent for several days. The load manager 48 may be configured to provide communication functions with the client of the water heater, including a transmission of an indicator of the salubrity index to the client and a reception of a command for controlling the operation of the water heater issued by the client, in order to manage the interactions with the client for this purpose. The indicator may be the salubrity index as such or a simple indication that the salubrity index is satisfactory or not, for example via one or more indicator lights in the case of a specialized client interface device (not shown), or via a display of a smart phone, a computer, etc.

Figure 4:
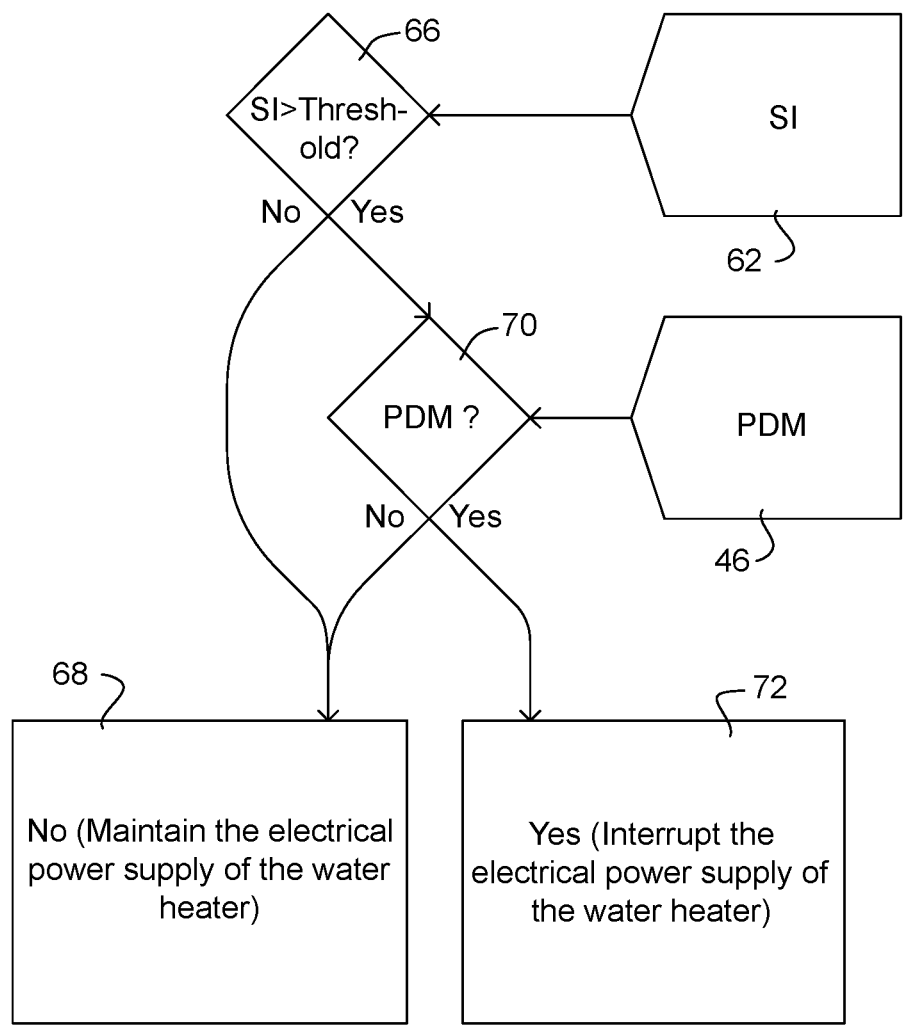
FIG. 4 is a flowchart illustrating a decision algorithm for control of a water heater according to an embodiment of the invention.

Referring to FIG. 4, the decision algorithm of the decision block 64 executed by the local controller 40 or the load manager 48, according to one of the above-described configurations, may comprise the following operations to determine the desired state of the switch 56 as a function of the updated value of the salubrity index SI and the load shedding request signal. The salubrity index SI may be such that the higher its value, the lesser risk of contamination by *Legionella* for the water heater. As depicted by block 66, the salubrity index SI is compared to a predefined threshold beyond which the water heater is considered as being sanitary in the whole of its volume. In the case where the index is calculated according to the above CIL equation, the threshold may be set for example at unity (1). A value greater than 1 is desirable. If the salubrity index SI does not exceed the threshold, the water heater is deemed insanitary and unfit to participate to a PDM event. In such a case, as depicted by block 68, the electrical power supply of the water heater is maintained. If a load shedding request signal is active during a period where the water heater is deemed sanitary as depicted by block 70, a decision to interrupt the electrical power supply of the water heater is taken (yes) as depicted by block 72. Otherwise, that is to say whether when the water heater is deemed insanitary or in the absence of a PDM event, a decision to maintain the electrical power supply of the water heater is taken (no, towards block 68). The decision algorithm 64 may include other functions. For example, the decision to maintain or not to maintain the electrical power supply of the water heater may be transmitted to the switch 56 of the local controller 40 of the water heater (as shown in FIGS. 2 and 3) after a random delay defined within a predetermined time range to avoid a synchronized switching of the electrical power supply of several water heaters responding to a same PDM event. Another example is the possibility for the local controller 40 to provide other services such as managing a resumption of the electrical power supply of the water heater after a power failure, or yet allowing diagnosing, using the evolution of the history of the indexes SI, a malfunction of the water heater for example in the case where one of the heating elements 10, 12 or one of the thermostats 22, 24 (as shown in FIG. 1) would be potentially defective, or yet for diagnosing a behavioural change using the evolution of the history of the indexes SI.

Figure 5:
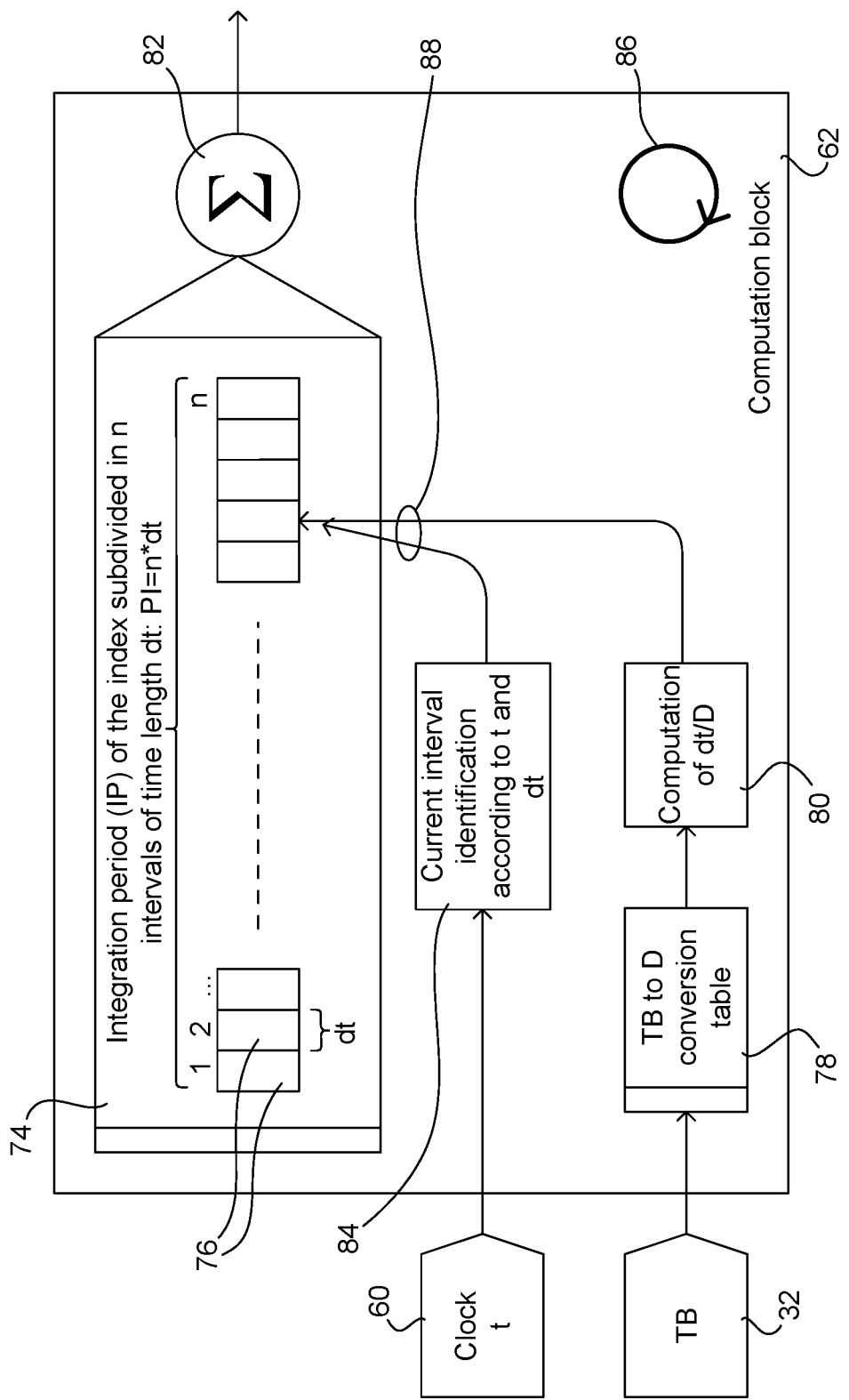
FIG. 5 is a flowchart illustrating an algorithm for updating a composite index of Legionella according to an embodiment of the invention.

Referring to FIG. 5, the salubrity index may be determined by ratios between a time length during which the temperature measured by the temperature sensor 32 is at a specific degree of temperature and a reference time length for the specific degree, for example according to Table 2. The preestablished criterion may be a salubrity index of at least one in order to prevent a proliferation of *Legionella* in the water heater. The computation block 62 may comprise a circular memory 74 having memory slots 76 allocated at intervals of an integration period of the salubrity index SI and in which the ratios are successively stored. A value of the salubrity index may be determined by a sum 82 of ratios stored in the memory slots 76 at a given time. If the CIL is used to determine the salubrity index, the computation block 62 may proceed from an exposure time of the water, at the base of the water heater, at temperatures high enough to promote a destruction of the *Legionella* bacteria. The integration period IP may be set so that the computed CIL minimizes a risk of presence of live *Legionella* in the water heater. The integration period is preferably long enough to fully cover the decontamination period of the water heater under normal conditions, and it is short enough for allowing the CIL to renew itself when a potential incubation period of the bacteria in the temperature ranges where it proliferates is followed by a period where the high temperature promotes instead its destruction. The integration period may be of a few hours to a few days. The computation of the salubrity index with the CIL uses the time t measured by the clock 60 of the local controller 40 (shown in FIGS. 2 and 3) and the temperature TB measured by the sensor 32 located at the bottom of the water heater, calibrated or not if needed. The integration period is subdivided into n intervals dt. A memory slot 76 is allocated to each interval dt within the integration period. Each memory slot 76 has an index number i evolving from 1 to n, corresponding to an iteration of the computation, which is continuously carried out 86. As depicted by block 84, each time a delay dt has elapsed since the last iteration, the index of the memory slot in use is incremented by one and returns back to 1 when equal to n. The measurement TB of the temperature sensor 32 may be rounded to the nearest integer Celsius degree (° C.). With Table 2 described above as depicted by block 78, the time period D corresponding to the rounded temperature is selected. When the rounded temperature TB is outside the values indicated in Table 2, the value D corresponding to the nearest temperature in Table 2 is selected. The value D represents the time required for destroying 90% of the *Legionella* contained in the water exposed at the given temperature. A value of the ratio dt/D is computed as represented by block 80 and is stored 88 in the current memory slot 76. The CIL index may be computed, for example, at each interval dt, once a day, or when a PDM event notification signal is active. The CIL is the sum of the cumulated values in all the memory slots 76 during the integration period ending at the present moment, as depicted by block 82.

The local controller 40 (shown in FIGS. 2 and 3) may be provided with a backup power source (not shown), such as a rechargeable battery if desired.

While embodiments of the invention have been illustrated in the accompanying drawings and described above, it will be evident to those skilled in the art that modifications may be made therein without departing from the invention.

The invention claimed is:

1. A system for controlling an electric water heater as per a load shedding request signal, the system comprising:
   a temperature sensor positioned in order to measure a temperature of water in a lower area of a tank of the water heater;
   a switch coupled to an electrical power supply circuit of the water heater, an opening and a closing of the switch being controllable by a control signal in order to interrupt or not interrupt an operation of the water heater; and
   a controller connected to the temperature sensor and to the switch, the controller being configured to:
      continuously determine a salubrity index of the water heater as a function of the temperature measured by the temperature sensor and a time measurement; and producing the control signal of the switch so that the switch causes an interruption of the operation of the water heater upon the load shedding request signal only if the salubrity index meets a preestablished criterion, wherein the salubrity index is determined by ratios between a time length during which the temperature measured by the temperature sensor is at a specific temperature degree and a reference time length for the specific degree, the preestablished criterion being a salubrity index having a value of at least one in order to prevent a proliferation of *Legionella* in the water heater.

2. The system according to claim 1, wherein the controller has an input for receiving the electrical power supply intended to the water heater, an output for providing the electrical power supply to the water heater, the switch being connected between the input and the output of electrical power supply of the controller, and the controller being powered by the electrical power supply intended for the water heater.

3. The system according to claim 1, wherein the controller comprises a clock that provides the time measurement, a computation block of the salubrity index connected to the clock and to the temperature sensor, and a decision block connected to the computation block of the salubrity index and to the switch, the computation block having processing functions for continuously processing the time measurement and the temperature measured by the temperature sensor and updating functions of the salubrity index of the water heater according to a predefined algorithm, the decision block having conditional logic functions depending on whether the salubrity index meets the preestablished criterion and whether the load shedding request signal is activated, and functions for producing the control signal of the switch, the control signal maintaining or causing the closing of the switch except when the salubrity index meets the preestablished criterion and the load shedding request signal is activated, in which case the control signal causes the opening of the switch.

4. The system according to claim 3, wherein the controller comprises a local controller near the water heater and a remote controller away from the water heater, the local and remote controllers communicating together, the functions of the blocks being distributed in the local and remote controllers.

5. The system according to claim 4, wherein the functions of the computation block are carried out by the local controller and the functions of the decision block are carried out by the remote controller.

6. The system according to claim 4, wherein the processing functions of the computation block are carried out by the local controller, and the updating functions of the computation block and the functions of the decision block are carried out by the remote controller.

7. The system according to claim 4, wherein the remote controller is comprised in a load manager of an electrical network powering the water heater and other apparatuses.

8. The system according to claim 7, wherein the load manager comprises communication functions with a client of the water heater including a transmission of an indicator of the salubrity index to the client, and remote control functions of the operation of the water heater according to a command received from the client.

9. The system according to claim 3, wherein the decision block has a function of random delay within a predetermined time range before producing the control signal.

10. The system according to claim 3, wherein the local controller has at least one of the following functions:
managing a resumption of the electrical power supply of the water heater after a power failure; and
diagnosing a malfunction or a behavioral change of the water heater as a function of a time evolution of the salubrity index.

11. The system according to claim 1, wherein the controller has a computation block comprising a circular memory having memory slots allocated at intervals of an integration period of the salubrity index and in which the ratios are successively stored, a value of the salubrity index being determined by a sum of the ratios stored in the memory slots at a given moment.

12. A method for controlling an electric water heater as per a load shedding request signal, the method comprising the steps of:
positioning a temperature sensor in order to measure a temperature of water in a lower area of a tank of the water heater;
coupling a switch to an electrical power supply of the water heater, an opening and a closing of the switch being controllable by a control signal in order to interrupt or not interrupt an operation of the water heater; and
connecting a controller to the temperature sensor and to the switch, the controller being configured to:
continuously determine a salubrity index of the water heater as a function of the temperature measured by the temperature sensor and a time measurement; and
producing the control signal of the switch so that the switch causes an interruption of the operation of the water heater upon the load shedding request signal only if the salubrity index meets a preestablished criterion, wherein the salubrity index is determined by ratios between a time length during which the temperature measured by the temperature sensor is at a specific temperature degree and a reference time length for the specific degree, the preestablished criterion being a salubrity index having a value of at least one in order to prevent a proliferation of *Legionella* in the water heater.

13. The method according to claim 12, wherein the switch is connected between electrical power supply input and output of the controller, the method further comprising the step of powering the controller by the electrical power supply intended for the water heater.

14. The method according to claim 12, wherein the controller comprises a clock that provides the time measurement, a computation block of the salubrity index connected to the clock and to the temperature sensor, and a decision block connected to the computation block of the salubrity index and to the switch, the method further comprising the steps of:
continuously processing, by the computation block, the time measurement and the temperature measured by the temperature sensor and updating the salubrity index of the water heater according to a predefined algorithm; and
executing, by the decision block, a conditional logic depending on whether the salubrity index meets the preestablished criterion and whether the load shedding request signal is activated, and producing the control signal of the switch, the control signal maintaining or causing the closing of the switch except when the salubrity index meets the preestablished criterion and the load shedding request signal is activated, in which case the control signal causes the opening of the switch.

15. The method according to claim 14, further comprising the step of distributing functions of the controller in a local controller near the water heater and a remote controller away from the water heater, the local and remote controllers communicating together.

16. The method according to claim 12, further comprising the steps of:
communicating with a client of the water heater, including a transmission of an indicator of the salubrity index to the client; and
remotely controlling the operation of the water heater according to a command received from the client.

17. The method according to claim 12, further comprising the step of producing the control signal of the switch after a random delay defined within a predetermined time range.

18. The method according to claim 12, further comprising at least one of the following steps:
managing a resumption of the electrical power supply of the water heater after a power failure; and
diagnosing a malfunction or a behavioral change of the water heater as a function of a time evolution of the salubrity index.

19. The method according to claim 12, wherein the salubrity index is determined depending on whether the temperature measured by the temperature sensor during a predetermined time interval is equal or greater than a predetermined minimum threshold of temperature.

\* \* \* \* \*